US008856590B2

(12) United States Patent
Grieco et al.

(10) Patent No.: US 8,856,590 B2
(45) Date of Patent: Oct. 7, 2014

(54) RELIABLE COMPUTE ENGINE, METHOD AND APPARATUS

(75) Inventors: Anthony Grieco, Irwin, PA (US); Ken Price, Export, PA (US); John L. Driscoll, Jeanette, PA (US); Stephen Schweizer, Pittsburgh, PA (US)

(73) Assignee: Compunetix, Inc., Monroeville, PA (US)

( * ) Notice: Subject to any disclaimer, the term of this patent is extended or adjusted under 35 U.S.C. 154(b) by 225 days.

(21) Appl. No.: 13/374,682

(22) Filed: Jan. 7, 2012

(65) Prior Publication Data

US 2013/0179727 A1 Jul. 11, 2013

(51) Int. Cl.
*G06F 11/00* (2006.01)

(52) U.S. Cl.
USPC ............................................. 714/11; 714/13

(58) Field of Classification Search
CPC .................... G06F 11/1641; G06F 11/1645
USPC ...................................... 714/10–13
See application file for complete search history.

(56) References Cited

U.S. PATENT DOCUMENTS

| | | | | |
|---|---|---|---|---|
| 4,967,347 A * | 10/1990 | Smith et al. | ...................... | 714/12 |
| 5,339,404 A * | 8/1994 | Vandling, III | ...................... | 714/1 |
| 5,812,757 A * | 9/1998 | Okamoto et al. | ................ | 714/11 |
| 6,038,685 A * | 3/2000 | Bissett et al. | .................... | 714/12 |
| 6,216,236 B1 * | 4/2001 | Miyao et al. | ..................... | 714/11 |
| 6,532,550 B1 * | 3/2003 | Crew et al. | ....................... | 714/11 |
| 6,988,221 B2 * | 1/2006 | Rasmussen et al. | ............ | 714/12 |
| 7,065,672 B2 * | 6/2006 | Long et al. | ....................... | 714/11 |
| 7,752,494 B2 * | 7/2010 | Del Vigna et al. | ............... | 714/12 |
| 7,937,442 B2 * | 5/2011 | Sekaran et al. | ................ | 709/204 |
| 2002/0169794 A1 * | 11/2002 | Jones et al. | .................... | 707/204 |
| 2004/0179092 A1 * | 9/2004 | LaPoint | ...................... | 348/14.08 |
| 2006/0190243 A1 * | 8/2006 | Barkai et al. | ....................... | 704/8 |

* cited by examiner

*Primary Examiner* — Philip Guyton
(74) *Attorney, Agent, or Firm* — Ansel M. Schwartz

(57) ABSTRACT

A redundant controller engine (RCE) of a system includes a first, second and at least a third redundant processing unit (RPU). The RCE includes an arbitrator in communication with the first, second and third RPUs which sends a message for a corresponding time requiring a decision to the first, second and third RPUs, and receives the decisions made by the first, second and third RPUs. The arbitrator accepts a first two matching decisions for the corresponding time received from the first, second and third RPUs, and sending the matching decision for the corresponding time to the system. The arbitrator has a first message processing unit (MPU) and a second MPU. The first MPU sends the message for the corresponding time to and receives the decisions for the corresponding time from the first, second and third RPUs. A method for processing data from a system. An apparatus for conferencing.

22 Claims, 6 Drawing Sheets

RELIABLE COMPUTE ENGINE, METHOD AND APPARATUS

FIELD OF THE INVENTION

The present invention is related to a Reliable Compute Engine that has a plurality of redundant processing units, a first message processing unit that ensures the redundant processing units are operating properly and at least a second message processing unit as a backup to the first message processing unit in the event the first message processing unit fails. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The present invention solves the problem of a redundant controller that remains reliable even when subjected to an anomaly such as a single event upset. In addition to redundancy, the design also provides for multiple compute engines (in the present invention, the RPUs) and a voting mechanism to detect failures. When a failure is detected, the system attempts to repair the condition to return to a fully functional state.

This invention is unique in that there is no auxiliary checkpoint or auxiliary replication scheme as there is when there is a fully redundant set of hardware to handle the redundancy. This eliminates costly periodic check pointing as the RPUs of the present invention are check pointed on every stimulus. This brings the type of costly hardware check pointing into a much simpler and less costly software solution.

An example of hardware in existing equipment that is no longer needed would be hardware such as Digital Equipment Corporation used to manufacture. One of their fault tolerant hardware solutions was the FT-410 model, also known as the Vaxft 410, where the processors of two physically separate but co-located computers were in precise instruction lock-step with one another. Each had their own hard drive, CPU, memory, etc. Additionally, in a scheme like the FT-410 there is additional cabling and dedicated hardware to monitor and enforce the lock-step of the processors. The present invention is void of such hardware devices.

BRIEF SUMMARY OF THE INVENTION

The present invention pertains to a Reliable Compute Engine (RCE) of a system. The RCE comprises a first, second and at least a third redundant processing unit (RPU). The RCE comprises an arbitrator in communication with the first, second and third RPUs which sends a message for a corresponding time requiring a decision to the first, second and third RPUs, and receives the decisions made by the first, second and third RPUs. The arbitrator accepts the first two matching decisions for the corresponding time received from the first, second and third RPUs, and sends the matching decision for the corresponding time to the system. The arbitrator has a first message processing unit (MPU) and a second MPU. The first MPU sends the message for the corresponding time to and receives the decisions for the corresponding time from the first, second and third RPUs. The second MPU sends subsequent messages for subsequent corresponding times to and receives decisions for the subsequent corresponding times from the first, second and third RPUs when the first MPU fails. Each MPU is a communication interface that communicates with the system.

The present invention pertains to a method for processing data from a system. The method comprises the steps of sending a message from a first MPU of an RCE to a first, second and third RPU of the RCE for a corresponding time requiring a decision by the first, second and third RPUs. There is the step of receiving by the first MPU decisions made by the first, second and third RPUs. There is the step of comparing by the first MPU the decisions until two of the decisions match. There is the step of accepting by the first MPU the decision that matches for the corresponding time received from the first, second and third RPUs. There is the step of sending the matching decision for the corresponding time to the system. There is the step of the first MPU failing. There is the step of sending subsequent messages by a second MPU of the RCE for subsequent corresponding times to and receiving decisions for the subsequent corresponding times from the first, second and third RPUs after the first MPU fails. Each MPU is a communication interface that communicates with the system.

The present invention pertains to an apparatus for conferencing. The apparatus comprises a Multipoint Control Unit (MCU) that communicates with parties to form a conference. The apparatus comprises an RCE having a plurality of RPUs that control the MCU and perform functions to maintain the conference, a first MPU that ensure the RPU's operation is correct, and a second MPU that ensures the RPUs operation is correct if the first MPU fails.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 8:
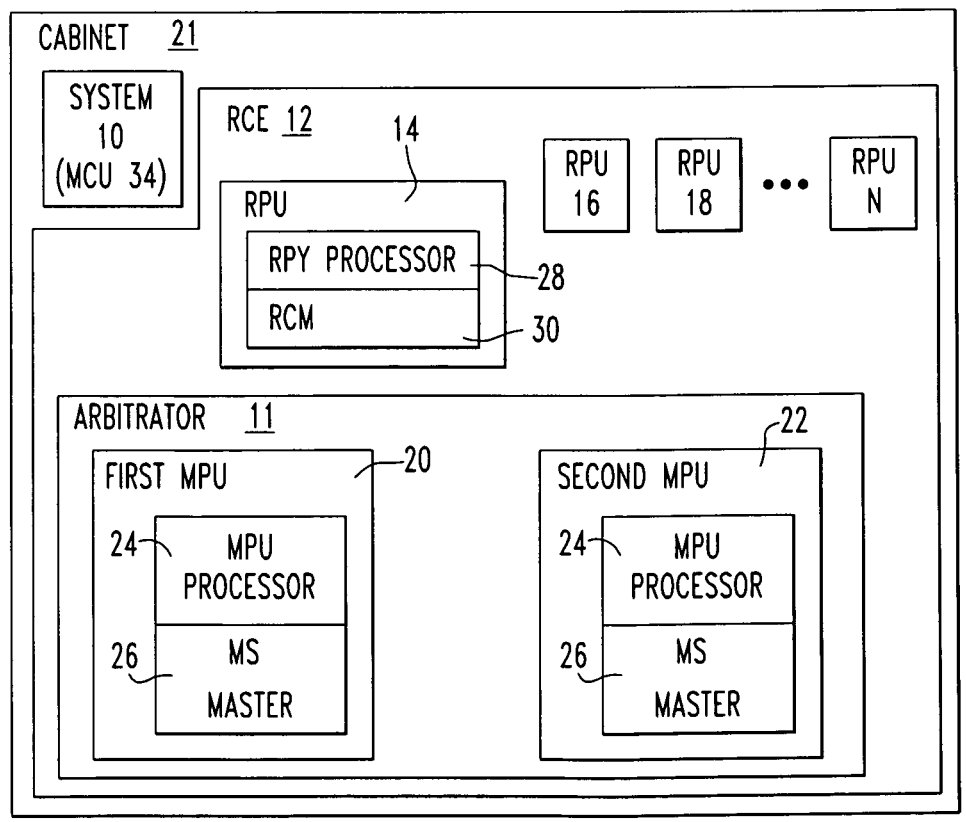
FIG. 8 is a block diagram of an RCE of a system of the present invention.

Referring now to the drawings wherein like reference numerals refer to similar or identical parts throughout the several views, and more specifically to FIG. 8 thereof, there is shown an RCE 12 of a system 10. The RCE 12 comprises a first RPU 14, second RPU 16 and at least a third RPU 18. The RCE 12 comprises an arbitrator 11 in communication with the first, second and third RPUs 14, 16, 18 which sends a message for a corresponding time requiring a decision to the first, second and third RPUs 14, 16, 18, and receives the decisions made by the first, second and third RPUs 14, 16, 18. The arbitrator 11 accepts the first two matching decisions for the corresponding time received from the first, second and third RPUs 14, 16, 18, and sends the matching decision for the corresponding time to the system 10. The arbitrator has a first MPU 20 and a second MPU 22. The first MPU 20 sends the message for the corresponding time to and receives the decisions for the corresponding time from the first, second and third RPUs 14, 16, 18. The second MPU 22 sends subsequent messages for subsequent corresponding times to and receives decisions for the subsequent corresponding times from the first, second and third RPUs 14, 16, 18 when the first MPU 20 fails. Each MPU is a communication interface that communicates with the system 10.

The first MPU 20 may synchronize execution of the message for the corresponding time by the first, second and third RPUs 14, 16, 18. Each MPU may include an MPU processor 24 and a message sequencer (MS) 26 that is a communication interface. The MS 26 of the first MPU 20 is an active MS 26 and the MS 26 of the second MPU 22 is a standby MS 26, unless the active MS 26 fails and then the standby MS 26 becomes the active MS 26. Each RPU may include an RPU processor 28 and a redundancy control manager (RCM) 30 that coordinates applications to run simultaneously on all RPU processors 28.

The MPUs and the RPUs may be disposed in a cabinet 21, such as one that conforms with ATCA constraints. Each RPU may receive each message that is received by the RCE 12. Both the active MS 26 and the standby MS 26 may receive each message received by the RCE 12. Each RCM 30 may send one or more responses to the active MS 26 to each message the RCM 30 receives. The active MS 26 may save responses it receives from the RCMs 30, and the MS 26 sends a time state event (TSE) message having information about the responses. Each RCM 30 may form a vote about itself, the other RCMs 30 and the active MS 26 and the standby MS 26 when the RCM 30 receives the TSE message.

The present invention pertains to a method for processing data from a system 10. The method comprises the steps of sending a message from a first MPU 20 of an RCE 12 to a first, second and third RPUs 14, 16, 18 of the RCE 12 for a corresponding time requiring a decision by the first, second and third RPUs 14, 16, 18. There is the step of receiving by the first MPU 20 decisions made by the first, second and third RPUs 14, 16, 18. There is the step of comparing by the first MPU 20 the decisions until two of the decisions match. There is the step of accepting by the first MPU 20 the decision that matches for the corresponding time received from the first, second and third RPUs 14, 16, 18. There is the step of sending the matching decision for the corresponding time to the system 10. There is the step of the first MPU 20 failing. There is the step of sending subsequent messages by a second MPU 22 of the RCE 12 for subsequent corresponding times to and receiving decisions for the subsequent corresponding times from the first, second and third RPUs 14, 16, 18 after the first MPU 20 fails. Each MPU is a communication interface that communicates with the system 10.

There may be the step of the first MPU 20 synchronizing execution of the message for the corresponding time by the first, second and third RPUs 14, 16, 18. The step of sending the message from the first MPU 20 to the first, second and third RPUs 18 of the RCE 12 for a corresponding time requiring a decision by the first, second and third RPUs 18 may include the step of sending the message from a MS 26 of the first MPU 20 to the first, second and third RPUs 18 of the RCE 12 for a corresponding time requiring a decision by the first, second and third RPUs 18, and the step of receiving by the first MPU 20 decisions made by the first, second and third RPUs 18 may include the step of receiving by the MS 26 of the first MPU 20 decisions made by the first, second and third RPUs 18. Each RPU may include an RPU processor 28 and an RCM 30 and there may be the step of coordinating with an RCM 30 of each RPU applications to run simultaneously on all RPU processors 28. The MPUs and the RPUs may be disposed in a cabinet. There may be the step of each RPU receiving each message that is received by the RCE 12.

Each MPU may include an MPU processor 24 and an MS 26 that is a communication interface. The MS 26 of the first MPU 20 may be a n active MS 26 and the MS 26 of the second MPU 22 may be a standby MS 26, unless the active MS 26 fails and then the standby MS 26 becomes the active MS 26. There may be the step of both the active MS 26 and the standby MS 26 receiving each message received by the RCE 12. There may be the step of each RCM 30 sending a response to the active MS 26 to each message the RCM 30 receives. There may be the step of the active MS 26 saving responses it receives from the RCMs 30, and the MS 26 sends a time save event (TSE) message having information about the responses. There may be the step of each RCM 30 forming a vote about itself, the other RCMs 30 and the active MS 26 and the standby MS 26 when the RCM 30 receives the TSE message.

Figure 7:
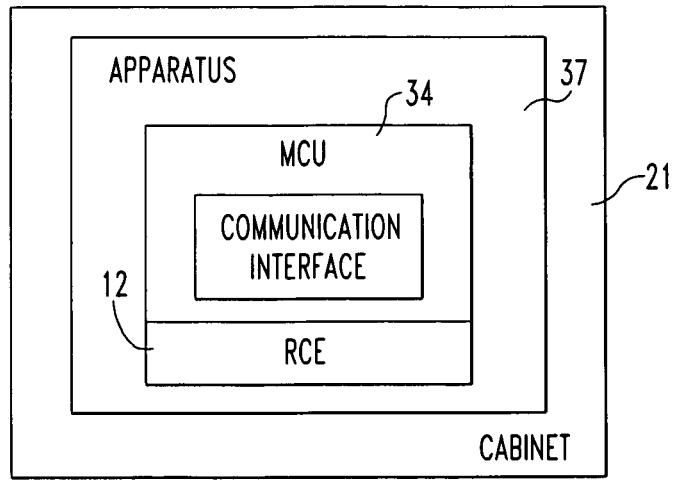
FIG. 7 is a block diagram of an apparatus of the present invention.

The present invention pertains to an apparatus 32 for conferencing, as shown in FIG. 7. The apparatus 32 comprises an MCU 34 that communicates with parties to form a conference. The MCU may be of the type sold by Compunetix, Inc. of Monroeville, Pa., such as the EVERGREEN or the Mission Voice Platform (MVP). The apparatus 32 comprises an RCE 12 having a plurality of RPUs that control the MCU 34 and perform functions to maintain the conference, a first MPU 20 and a second MPU 22 that ensure the RPU's operation is correct, and a second MPU 22 that ensures the RPU's operation is correct when the first MPU 20 fails.

In the operation of the invention, the RCE 12 includes a collection of supplemental software processes that protect the critical control processes of the system 10 to enhance its reliability. The RCE 12 protects these processes by running them simultaneously on multiple, independent microprocessors and using a voting mechanism to verify their output.

The RCE 12 contains four (4) Redundant Processing Units (RPUs) and two (2) Message Processing Units (MPUs). The RPUs are voting members of the RCE 12 whereas the MPUs are not.

Each MPU contains a Message Sequencer (MS) 26, which acts as a communication interface between the control applications within the RPU processors 28 and all of the other software processes. One MS 26 is designated as active and the other as standby.

The RPUs determine when to switch which MS 26 is active and which is standby. The RPUs that are in a qualified state use state information received from the MSs to decide when to switch the status of the MSs 26. If the state information indicates a problem with the active MS or if the state information is not received from the active MS before a timeout period expires, the RPUs promote the standby MS to take over as the new active MS.

After an active MS 26 fails, the RCEs 12 transition the standby MS 26 to become the active MS 26. The newly active MS 26 remains active for as long as it is able. When the previously failed MS 26 recovers, it becomes the new standby MS 26. The RPUs have no preference for which MS 26 is active and which MS 26 is standby.

Figure 1:
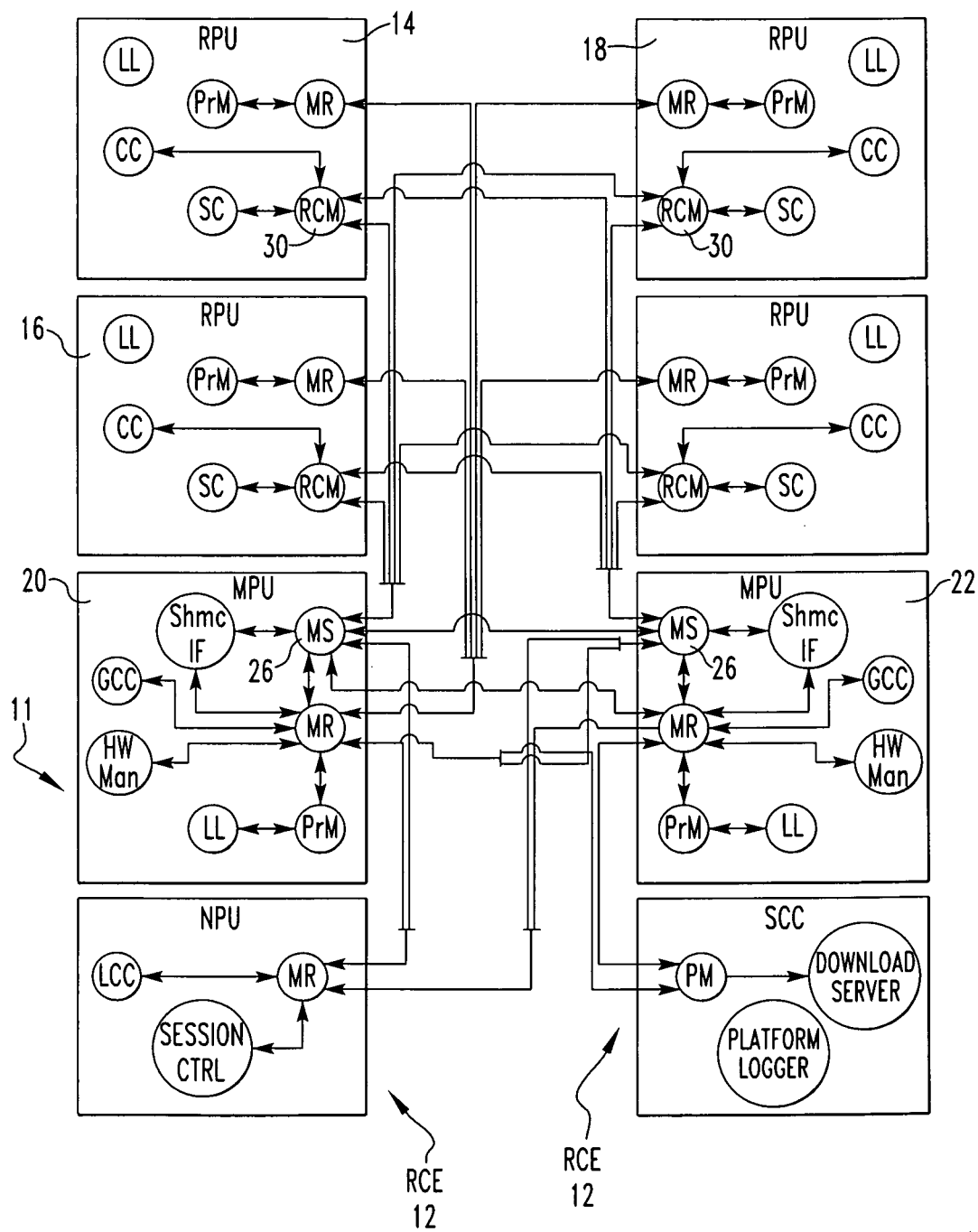
FIG. 1 shows a Reliable Compute Engine—Full Redundancy.

Each RPU contains a Redundancy Control Manager (RCM) 30, which acts as a multiple instance coordinator, allowing the critical control applications to run simultaneously on all RPU processors 28. FIG. 1 shows the RCE 12 implementation. Each qualified RPU receives each message that is sent to the RCE 12. The MS 26 and RCM 30 processes work together to evaluate the messages.

Messages are continuously received by both the active and the standby MSs 26. These messages may be health or conference related messages. The MS 26 forwards the messages to the RCM 30 process running on all four RPU processors 28. These messages can be queued so that no messages are ever lost. The RCM 30 either directly acts on the message or forwards it to the applicable process inside the RCE 12 for final processing.

Each RCM 30 provides the MS 26 with a response about the received message. The MS 26 in turn keeps track of all received responses and periodically sends a Time State Event (TSE) message to the RCM 30 containing the notes about the messages received from the RCMs 30 and from the peer MS 26. When the RCMs 30 receive the TSE message, the RCM 30 forms a vote about itself, the other RCMs 30, and the two MSs 26.

In the ideal situation, all four RPU responses are the same, and the RCM 30 forwards the message. In a failure situation, all four responses are not the same, and the MS 26 determines response validity and only forwards valid responses, discarding responses from questionable hardware or from a logical failure.

The system 10 communicates with the MS 26 process over an Ethernet interface. The MS 26 also communicates with the RPUs over Ethernet. The MSs communicate with each other primarily over Ethernet, but they also have a communication path over SRIO. The SRIO communication relays state information when the Ethernet interface is not functional.

The RCE 12 is essentially a protective wrapper or monitor around the critical control processes, and it does not make critical decisions related to system 10 operations. The fundamental idea of the RCE 12 is that it runs multiple independent copies of the controller and then votes on the output of each. This examination of the output from the RPU (or lack of output from the RPU) is the only criteria by which the control processors are deemed qualified or disqualified.

The RCE 12 approach protects against single points of failure in processors, communications links between processors, or entire hardware modules; and in many cases, the RCE 12 protects against multiple failures of these components. In summary, the RCE 12 implementation provides distributive level control that can tolerate multiple failures without impacting system 10 performance or operations.

The purpose of the RCE 12 is to provide a controller that is reliable, resilient and trusted. In addition to the redundancy offered by the multiple processors, there is verification that continually guarantees that consistent state information exists across all of the processors that are part of the RCE 12. The redundancy provides for a complete failure of an RCE 12 processor. This verification scheme provides protection from one of the processors having an undetected internal failure.

Ideally, tasks communicating with the RCE 12 are unaware of the separate processors that comprise the RCE 12. They communicate with the RCE 12 as if it were a single entity. However, some component of the system must broadcast the messages from the individual tasks to the processors comprising the MSs 26.

In the MVP, the RCE 12 is made up of two carrier cards. The non-MS RCE 12 applications run on each of the RPU processors 28 on each of the carrier cards that are part of the RCE 12. Additionally, the carrier cards that are part of the RCE 12 contain MPU processors 24 where the MS 26 resides. In order to remain in sync, the application processors must receive all of the incoming messages synchronously. The MS 26 synchronizes message execution over the RCE 12 modules. It also verifies the resulting replies match across all available RCE 12 processes. Only one MS 26 actively passes messages to the RCE 12 modules. The other operates in a standby mode. If the active MS 26 fails, the standby MS takes over. All communications to and from the non-MS RCE 12 processes pass through the MS 26. The two MSs 26 appear to the system tasks as a single entity with two network connections to the outside.

The RCE 12 relies on the MS, which coordinates the message execution and verifies that all the computing elements generate the same outputs. This scheme protects the integrity of all messages sent from the control units from both transient and permanent hardware failures.

The design conforms to ATCA constraints. The chassis assumes an active/standby redundancy scheme allowing for two control blades. The design includes two RPUs along with an MPU on each of the two control blades. The four RPU and two MPU processors on the two control blades form the RCE 12.

The RCE 12 design is based on an ATCA architecture. Either a 6 or 14 slot ATCA chassis can be used to support a fully redundant RCE 12 build out. For both chassis types, there are two slots designated as hub slots. The RCE 12 runs on a Compunetix carrier module (Part No. 8927-7800) that also has a Compunetix AMC module (Part No. 8931-1201) installed within it. Two carrier modules (each with one AMC module) are required, one in each hub slot. The carrier module has two general-purpose processors. With the AMC module installed, a total of three processors are available on each carrier card. One processor on each carrier card provides the MS capability. The other two (one on the carrier module and one on the AMC module) run as RPU processors.

To the rest of the system 10, the RCE 12 appears as a single computer engine. This simplifies the interface requirements of the other modules. For example, the Platform Manager (PM) does not need to coordinate communications with four separate controllers. Rather, it can simply establish a redundant connection with a single controller. The same holds true for all of the other connections to the RCE 12. Redundant connections are also established from the PM to the MVP switch. The Platform Manager hosts the system configuration database, administrative controls, operational configurations and historical logs.

FIG. 1 depicts the processes that make up the RCE 12 and the communication paths between them. In this case, the RCE 12 is fully redundant, with four RPU processors and two MPU processors 24.

The RPU monitors the health of the chassis and runs the processes expected to make the key conferencing decisions. The RCM 30 process on the RPU manages the redundancy state of the RPU. It initiates and controls the behavior of the other redundant processes running on the RPU. It is the redundant processes like the Conference Controller (CC) and the Switch Controller (SC) that store the conference and chassis state information.

The MPU acts as the messaging gateway between the RPU and the rest of the system 10. The MS 26 process runs on the MPU. This process is responsible for coordinating the sequence of messages sent to the RPU in order to keep the conference state information the same on all RPUs. It also verifies that the messages sent from the RPU are identical. It compares the contents of the messages from all the RPUs and passes a message on when at least two of them match.

The RCE 12 logic exists mainly between the RCM 30 and MS 26 processes. The goal is to limit the complexity of the RCE 12 to these processes. The redundancy process running on the RPU only has to support replication. No additional RCE 12 logic is required.

Figure 2:
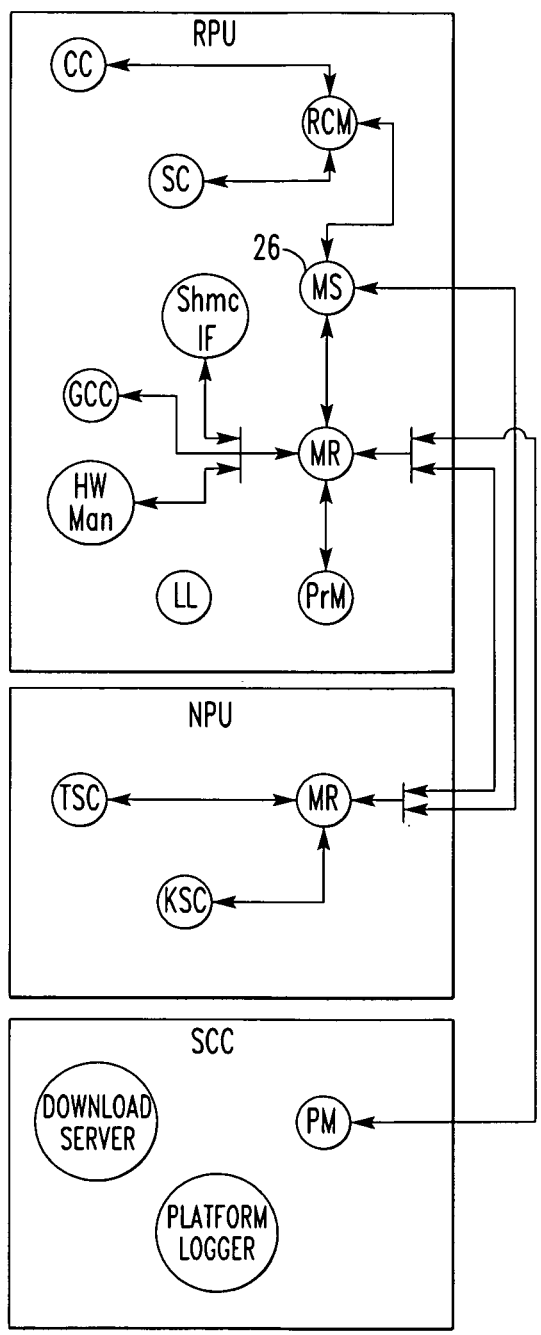
FIG. 2 shows a Reliable Compute Engine—Non-Redundant.

For a small system 10, it is possible to run the RCE 12 on a single processor without redundancy, as depicted in FIG. 2. All of the same processes as the redundant RCE 12 are still included. This allows for the same code to be used in either case.

Figure 3:
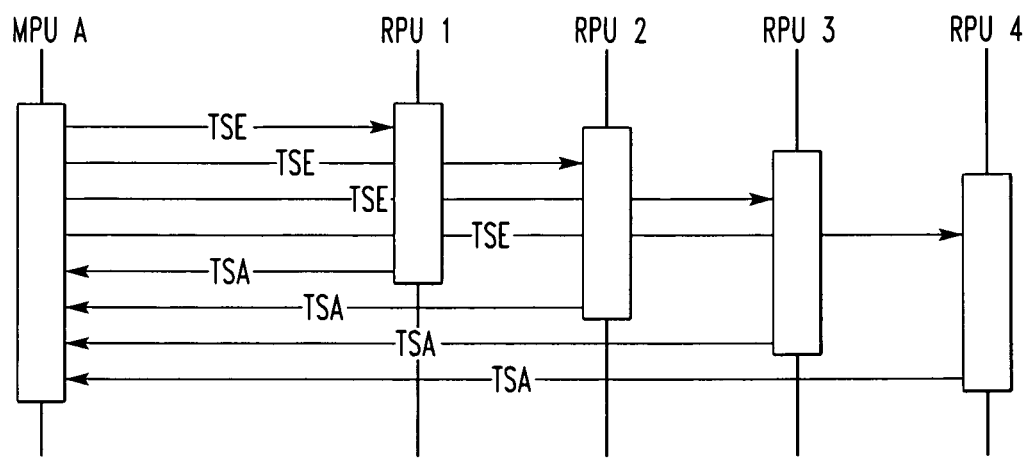
FIG. 3 shows a Time State Event Message Sequence.

The RCE 12 state is coordinated between RCM 30 and MS 26 with a set of messages—the time/state event message (TSE) and the time/state acknowledge (TSA) message, as shown in FIG. 3. The first thing that an MS 26 does after it is powered on and comes up to a working state is send a time/state event (TSE) message. It attempts to send it to all four RCM 30 processes on the RPUs. The RCM 30 processes remain in an initial state after power on until they receive this message.

The TSE message coordinates both time and RCE 12 state information between the four control processors. Both MSs send this message, regardless of which one is active. The message includes the current tick count and the RCE 12 state information of all the processors that make up the RCE 12. For each of the four control modules, the state information includes the RCE 12 state, the activity/qualified state, and the state of the connection between each of the controllers and the other MS.

A new TSE message with updated time and state information is queued up to be sent every 10 milliseconds. If the MS 26 is not waiting for an acknowledgement from a message that was previously sent to the controllers, it can immediately send the TSE message. Otherwise, the TSE is sent as soon as the acknowledgement from the previous message is received. Subsequent TSE messages must account for the latency in processing the previous TSE. For example, if the MS 26 sends a TSE and it takes the RCM 30 one millisecond to send the TSA, the next TSE will be sent nine milliseconds after the receipt of the TSA from the former TSE. If sending a TSE is late by more than 10 milliseconds, the next TSE is incremented by the number of 10 millisecond periods that have elapsed. Ideally, however, the TSEs are sent at precisely 10 millisecond intervals.

When an RCM 30 receives the time/state message, it responds with a time/state acknowledge (TSA) message. The acknowledge message includes the tick count received in the TSE and the RPU's current state. The state information in the TSA message is formatted just as it is in the TSE message. An MS 26 to RCM 30 Time/State Event (TSE) message follows:

```
struct RPUTimeStateRecord_Ty
{
    U32 rpuCount;
    U32 rpuState;
    U32 mpu1Flag;
    U32 mpu2Flag;
    U32 rpuAction[4];
    U64 indicatedTickCount;
};              /* 40 Bytes */
struct TimeStateEventData_Ty
{
    U64 tickCount;
    U32 primaryMPU;
    U32 queueCount;
    RPUTimeStateRecord_Ty[4];
};              /* 176 Bytes */
```

The tick count of the TSE represents elapsed milliseconds. Typically, it is incremented by ten each time a new time/state event (TSE) message is sent out by the MSs 26. This counter synchronizes relative time across the four control modules. The tick counter is used by any action on a RCE 12 process that requires a time out or the occurrence of an event that is based on time. This insures that all the timeouts on the RPUs occur at the same time—the time when they each receive the TSE message.

The primary MPU flag indicates if the sequencer sending the TSE is currently the primary active MPU. The MPU considers itself the primary MPU when a majority of qualified RPUs consider it the primary MPU. In the event of a tie, MPU-A (the MPU in the lower slot) is considered the primary MPU. Timing decisions made by the RPU are based on information coming from the active primary MPU.

The queue size is sent to the RCM 30 to provide it with a sense of how busy the MS 26 is at the time of the message. This field contains the number of messages in the queue of the MS 26. This information determines the replication rate. The replication rate basically determines how much replication data can be sent before the next TSE message arrives.

The CPU count is state dependent. In the CONFIGURE HOLD state, the CPU count indicates the number of RCE 12 time count field increments remain before configuration starts.

The MPU flags (one for each of the four RPU modules) are based on the contents of the TSA messages sent from the RPU modules. The RPU 12 states (one for each RPU) are relative to the RCE and are based on the previous state received from each of the RCMs 30. If a TSA has not been received from a RCM 30, the UNKNOWN state is returned.

Table 1 identifies the valid RPU RCE 12 states.

TABLE 1

RPU States

| | State Name | Meaning |
|---|---|---|
| 0 | UNKNOWN | The state of the RPU has not been established |
| 1 | INITIAL | The RPU has just been started and will be ready soon. |
| 2 | READY | The RPU is ready to configure itself or to be replicated by other RPUs. |
| 3 | CONFIGURE HOLD | The RPU is ready to begin configuring, but is waiting for other RPUs to observe that is it is ready to configure itself. |
| 4 | CONFIGURE PENDING | The RPU is ready to move into the CONFIGURING state. |
| 5 | CONFIGURING | The RPU is currently configuring itself from data it received from the PC server. |
| 6 | REPLICATION HOLD | The RPU is ready to begin replicating, but is waiting for other RPUs to observe that is it is ready to configure itself. |
| 7 | REPLICATION PENDING | The RPU is waiting to transition to the REPLICATING state. |
| 8 | REPLICATING | The RPU is currently replicating the state information from the data of other RPUs in the QUALIFIED state. |
| 9 | SYNCH | The RPU has stopped changing states to synchronize its actions with the other RPUs. |
| 10 | QUALIFIED READY | The RPU is ready to move to the QUALIFIED state. |
| 11 | QUALIFIED | The RPU is fully configured and considered a trusted RPU. |
| 12 | DICTATOR | The RPU has been declared as the dictator of the system in a system where more than one RPU was previous QUALIFIED but the states of the RPUs have fallen into disparity. |
| 13 | FAILURE | The RPU was previously qualified but has since failed. |

Figure 4:
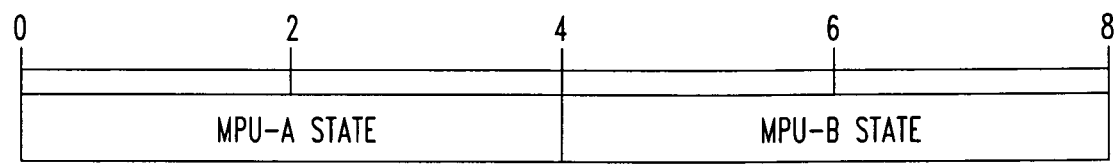
FIG. 4 shows MPU flags.

The MPU flags represent the state of MPU-A and MPU-B as seen from each of the RPUs. These flags as seen in the TSE/TSA messages are depicted in FIG. 4.

The possible states for the MPU are Unknown, Active, Valid (able to move to the primary state), Primary, and Failed. All other values indicate error conditions. If the RPU has not received any messages from a MPU, it returns unknown. Once a RPU receives the first TSE, it returns active. If the RPU determines the MPU is sending valid information, it returns valid. If the RPU determines the MPU that sent valid information is the active MPU, it returns primary. If the RPU believes that the MPU has failed for any reason it returns faded.

The active MS 26 sends the TSE to all available RCMs 30 via Ethernet and to the standby MS 26 via both Ethernet and the SRIO network. It is sent via SRIO to ensure a "split-brain" situation does not occur if the Ethernet network links between the two hub blades is severed. If the TSE were not sent via SRIO, the two RPUs on one blade would assume the two RPUs on the other blade failed and vice versa. The pairs of RPUs on each blade would likely match each other's state and disqualify the two RPUs on the other blade. At this point, each blade would assume that it was in control. In essence, both halves of the brain would assume full control of the switch.

When the standby MS 26 gets the TSE from the active MS 26, it ensures the expected time tick is present. If the received time tick differs from the expected time tick, the MS 26 alerts the RCMs of the discrepancy. The RCMs 30 decide which MS 26 is the active MS 26, and the MSs 26 obey the decision of the RCMs 30.

In a case where the "split-brain" situation arises, the MS 26 that was previously the active MS 26 remains the active MS 26, and the two RPUs on the same blade as the active MS become the RCE 12. The standby MS 26 marks the two RPUs on its blade as disqualified and sends an alarm to the active MS 26 and, if possible, to the server. The active MS 26 sends an alarm to the qualified RPUs and the server.

When an RCM 30 starts up and gets to a working state, it does nothing until it gets a TSE message from one of the MSs 26. When the controller receives a TSE message, it responds with a TSA message. The MS expects to receive a TSA message before it sends the next TSE (or any other) message. If any control processor does not respond within a full time tick, it is considered inactive and is assigned the FAILURE state. The following is an RCM 30 to MS 26 Time/State Acknowledge message:

```
struct TimeStateEventAckData_Ty
{
    U64 m_tickCount;
    U32 rpuAckOriginator;
    U32 syncCount;
    U32 rpuState;
    U32 mpu1Flag;
    U32 mpu2Flag;
    U32 rpuAction[4];
};   /* 44 bytes */
```

The tick count sent back in the TSA message matches the tick count received in the TSE message. The RPU number identifies which RPU the information is from. The RPU RCE 12 state and MPU flags are the same as described above. The flags indicate how the RPU sending the TSA views the MPU state (see Table 2).

The RPU directed state defines the actions that each RPU believes each of the other RPUs should be performing. To keep the message structure consistent, all four RPUs are defined in the TSA message. The RPU bases its action on its current state.

TABLE 2

RPU RCE Actions

| Value | Action | Description |
|---|---|---|
| 0 | Initialize | |
| 1 | Get Ready | |
| 2 | Hold for Configuration | The RPU should go to the CONFIGURATION HOLD state. |
| 3 | Synchronize Configuration | The RPU should go to the CONFIGURATION PENDING state. |
| 4 | Configure | The RPU should go to the CONFIGURATION state. |
| 5 | Hold for Replication | The RPU should go to the REPLICATION HOLD state. |
| 6 | Replicate | The RPU should go to the REPLICATE state. |
| 7 | Qualify | The RPU should go to the QUALIFIED state. |
| 8 | Disqualify | The RPU should be placed into the DISQUALIFIED state. |

The physical RPUs are numbered as shown in Table 3. These numbers indicate which RPU the RPU-specific fields of the TSE and TSA messages apply to.

TABLE 3

Physical RPU Numbering

| RPU Physical Location | RPU Number |
|---|---|
| The RPU on the carrier card of the first control blade. | 1 |
| The RPU on the carrier card of the second control blade. | 2 |
| The RPU on the AMC of the first control blade. | 3 |
| The RPU on the AMC of the second control blade. | 4 |

Figure 5:
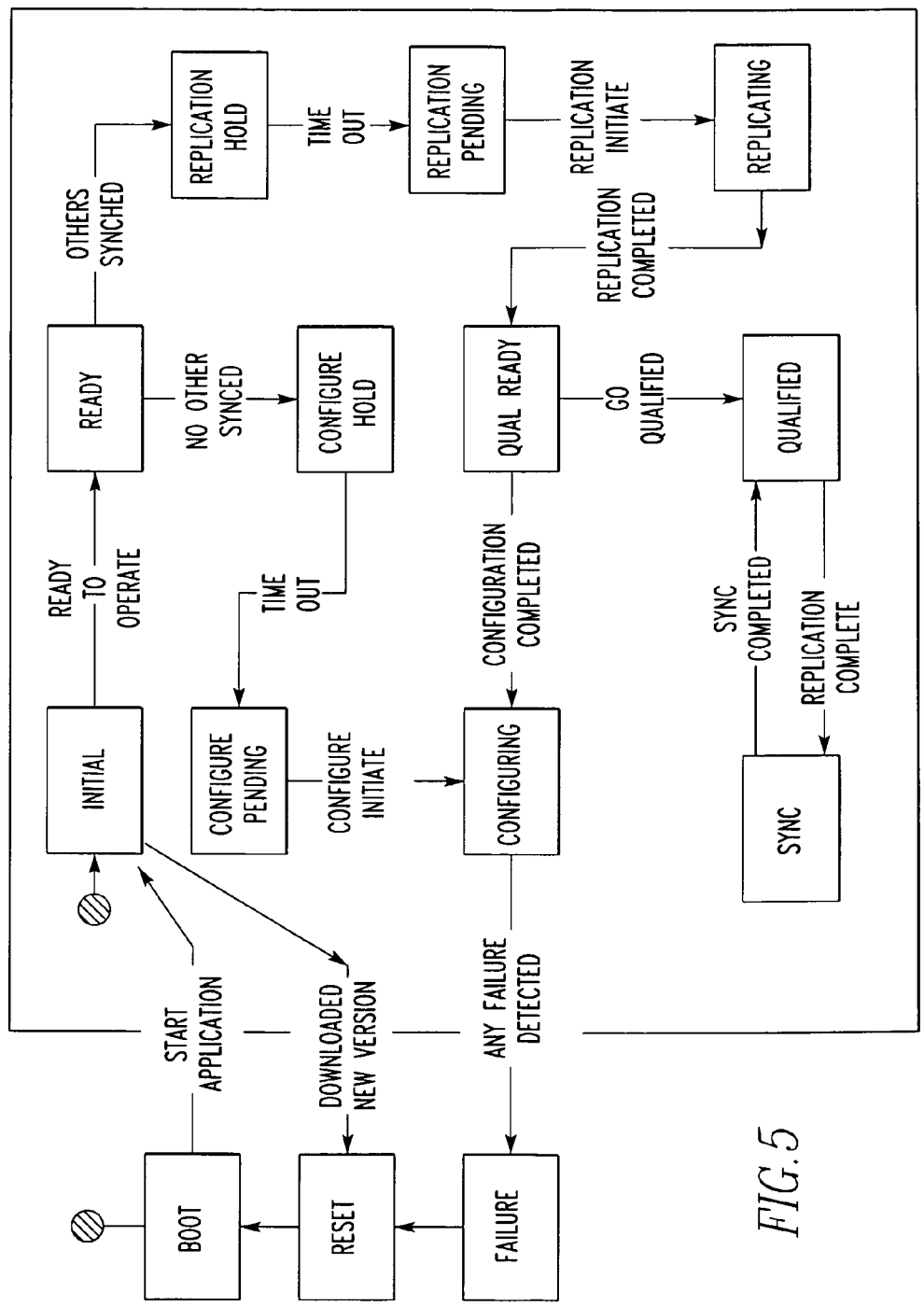
FIG. 5 shows an RPU State Diagram.

When an RPU controller is not on or is on and has not yet responded to a TSE message, the MPU sends an UNKNOWN status in the TSE for that RPU (see FIG. 5). The RCM 30 never reports itself as UNKNOWN.

After power on, the RCM 30 responds with the INITIAL state in the first TSA sent back to the MS 26. The RCM remains in the INITIAL state until the software is loaded and ready to operate as a controller. At that point it sends a READY state in the next TSA.

The very next time the RCM receives the time/state message from the MS 26, it should see itself as READY. If an RPU is the only one that is in the READY state, and if the other RPU modules are in the UNKNOWN state, the INITIAL state or an error state, its next response indicates it is in the CONFIGURE HOLD state, and the synchronizing count is set some value higher than one to configure a time out for the CONFIGURE HOLD state. If there are other RPUs that are in the CONFIGURE HOLD state and if there is additional hold time pending, the RCM 30 may also go to the CONFIGURE HOLD state. If the hold is due to expire on the next TSE, then it should go to the CONFIGURE PENDING state with the expectation that the other RPU currently in the CONFIGURE HOLD state will also go to the CONFIGURE PENDING state.

The CONFIGURE HOLD state provides a synchronization point for RPUs that have been started at nearly the same time. Since two RPU modules are on the same ATCA carrier card, it is very likely that this scenario will occur.

In a situation where all four RPUs are in the CONFIGURE HOLD state, there is no need to wait for the timeout period to expire. In this case, all four RPUs transition to the CONFIGURE PENDING state immediately.

While in the CONFIGURE HOLD state, the RCM 30 decrements the synchronization count by one each time a TSE is received. When the synchronization count reaches zero, the RCM 30 goes to the CONFIGURE PENDING state. The timeout is used to wait for the other RPUs to get to the point of needing configuration information. If the timeout is long enough, it is possible for all the RPUs to gather configuration information at the same time. The RCM 30 is in the CONFIGURE PENDING state for only one TSE/TSA period. The very next state reported is the CONFIGURING state.

While in the CONFIGURING state, the RCM 30 sends requests to the PC server in order to configure itself. The RCM 30 continues to query for its configuration until there is no additional configuration information to obtain. After all configuration information is complete, the controller goes to the QUALIFIED state.

While the RCM 30 is in the READY state, if there are any other RPUs in the QUALIFIED, SYNC, or the CONFIGURING state, the RCM 30 will not go to the CONFIGURING state. Instead, it will wait for the other RPU modules to send a recover action request. If the other RPUs are in the QUALIFIED state, the action can be sent immediately. If they are in the QUALIFIED SYNC or CONFIGURING state, the action is sent when they get promoted to the QUALIFIED state.

At that point the RCM 30 goes to the REPLICATION HOLD state and set the synchronization count of the TSA message to some value greater than one to establish a time out for the REPLICATION HOLD state. If there are other RPUs that are in the REPLICATION HOLD state, the RCM 30 may also go to the REPLICATION HOLD state if there is additional hold time pending. If the hold is due to expire on the next TSE, the RCM 30 should go to the REPLICATION PENDING state with the expectation that the other RPU currently in the REPLICATION HOLD state also goes to the REPLICATION PENDING state.

The REPLICATION HOLD state provides a synchronization point for RPUs that have been started at nearly the same time. Since two RPU modules are on the same ATCA carrier blade, it is very likely that this scenario will occur.

When the RCM 30 receives the replication message, it transitions to the REPLICATING state. When the other RPU modules see the transition from REPLICATION PENDING to REPLICATING, they set all objects to dirty, indicating replication is required.

If the other RPU is in the CONFIGURING state, it does not expect any replication messages until the configuring RPU matures to the QUALIFIED state. The RCMs 30 that are sending replication messages go to the SYNC state after they send all the required replication messages. The MS 26 no longer sends any control messages to any RCMs 30. When the RCM 30 that is in the SYNC state receives a message from the MS 26 acknowledging that it is in the SYNC state and when there are no further outstanding replication messages that must be sent, the RCM 30 returns to the QUALIFIED state. At the same time, the RCM 30 that was replicating goes to the QUAL READY state. Upon seeing the QUALIFIED state, the MS 26 starts sending control messages again. The MS 26 sends the same control messages to all of the QUALIFED and QUAL READY controller modules. The QUAL READY controller switches to QUALIFED after it gets back a time/state message setting itself to the QUAL READY state and another controller to the QUALIFIED state. The QUAL READY state is a "pre-charge" of the QUALIFIED state. It allows other RCMs 30 and the MSs 26 to know then the RPU is going to move to the QUALIFIED state.

If a failure is detected on the RPU while it is in any of the operational states, the RPU switches to the FAILURE state. Next, it resets and attempts to recover. The other QUALIFIED RPUs can force a RPU in the FAILED state to reset. In this situation, the two RPUs on the blade opposite the blade with the RPU in the FAILED state vote by proxy to reset the failed RPU. The MS 26 on the board with the RPU in the FAILED state casts votes as long as both RPUs on the other blade cast the same vote. A RPU on the carrier card can be reset through the reset lines, which are controlled through the CPLD. The RPU running on the AMC can be reset by telling the Shelf Manager Card (ShMC) to power the AMC off and then on again.

The RCM 30 uses the time/state message to gauge the health of the other three RCMs 30. The rules that determine when the RCM 30 is to reset another RPU depend on how many voters are running and the RPU's reported status (see Table 4).

TABLE 4

Qualification State Table

| Message Sequencer A Report | | | | Message Sequencer B Report | | | | |
|---|---|---|---|---|---|---|---|---|
| RPU 1 | RPU 2 | RPU 3 | RPU 4 | RPU 1 | RPU 2 | RPU 3 | RPU 4 | Result |
| Qual | Qual | Qual | Qual | — | — | — | — | All Qualified |
| Qual | Qual | Not Qual | Qual | — | — | — | — | RPU 3 Disqualified |
| Qual | Qual | Qual | Qual | Qual | Qual | Qual | Qual | All Qualified |
| Qual | Qual | Not Qual | Qual | Qual | Qual | Not Qual | Qual | RPU 3 Disqualified |
| Qual | Qual | Not Qual | Qual | Qual | Qual | Qual | Qual | Message Sequencer A Failure |

If both MSs 26 agree that an RPU has failed, the RPU is voted to the FAILURE state by its peers, thus forcing a reset. If only a single MS 26 indicates a failure, then the MS 26 is determined to be in the MPU FAILED state by all QUALIFIED RCMs 30. If an inconsistent result comes back from both MSs 26, a double failure has occurred, and the RCM 30 on the lowest numbered RPU which was previously in the QUALIFIED state attempts to continue operations in a degraded mode of operation, and it reports its state as DICTATOR. Since there must have been multiple failures to get into this state, valid redundant operation is no longer possible. Either the whole RCE 12 can be shut down or the DICTATOR can make an attempt to return the system 10 to a normal operating mode by resetting other modules while continuing to operate.

It is important to note that both the active and standby MS 26 send the TSE independent of each other. Each RCM 30 responds with a TSA directly to the MS 26 that sent the TSE. And as mentioned above, the active MS 26 sends a TSE to the standby MS 26, and the standby MS 26 sends a TSA back to the active MS 26.

Messages received by the MS that are destined for the RCM 30 are placed into the tail end of a queue. Messages are selected from the head of the queue are forwarded to all four RCM 30 processes. Prior to sending the message, the MS 26 records the source object id (OID) and the RCE 12 sequence number.

The RCM 30 forwards the request to the RCE 12 process that handle the service requested. The reception of the message may cause additional messages to be sent. If so, those messages are sent to the MS 26 on the MPU. Messages cannot be sent directly from one RPU redundant process to another because they must be synchronized by the MS 26. Once any and all messages generated have been sent, a message processed message is sent to indicate that the message processing has been completed. The message processed message contains the source OID and RCE 12 sequence number of the request message.

The redundant controller services all have a loop that looks like this:

```
While (continueRunning == true)
{
    waitForNextMessageToProcess(message);
    processNextMessage(message);
    sendMessageProcessed(message);
}
```

Figure 6:
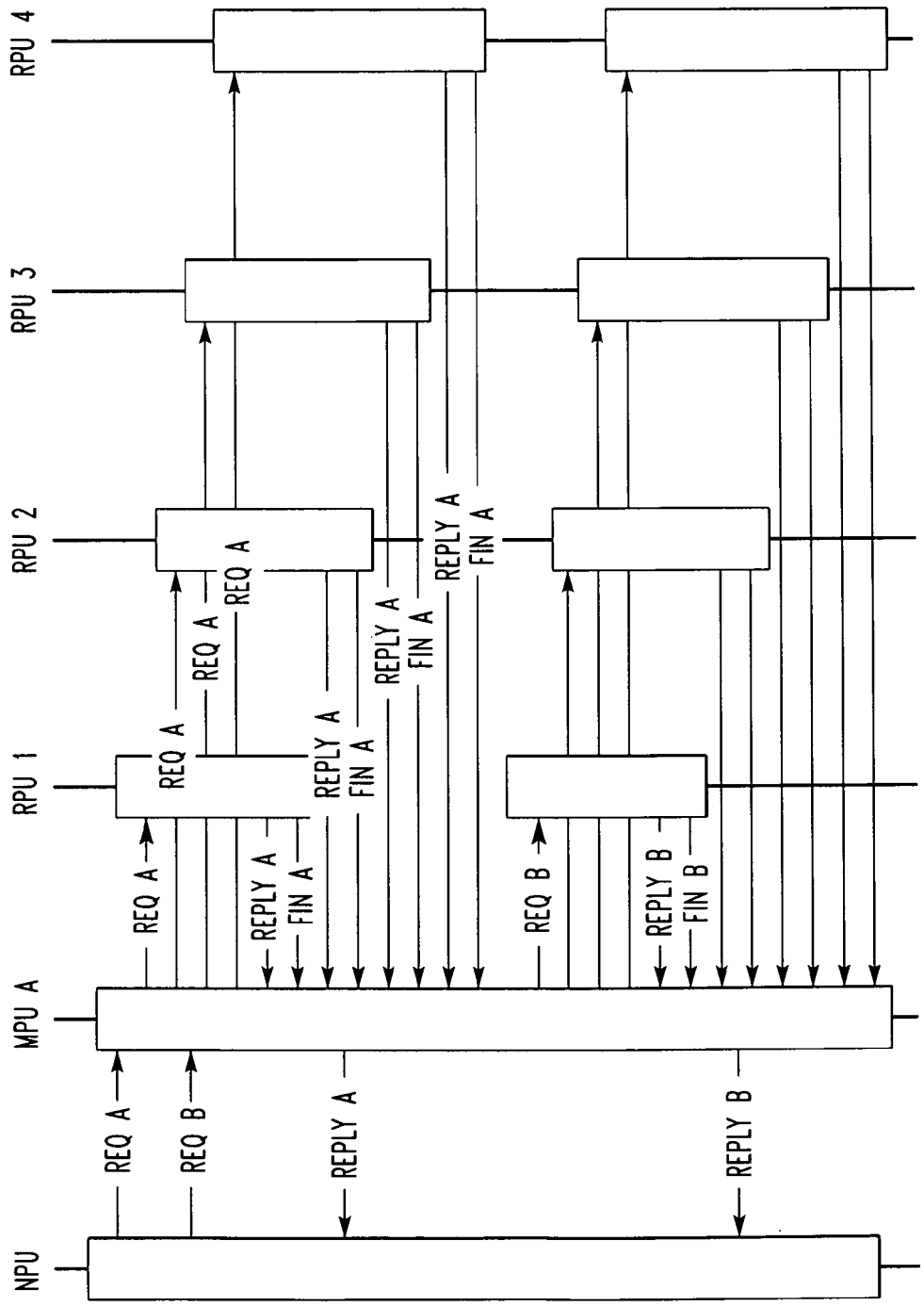
FIG. 6 shows a Request/Reply Sequence Diagram.

They all wait for the next message. The next message is processed when it arrives, possibly causing one or more messages to be sent. After all the processing is done, a message-processed message is sent back to the MS 26 indicating processing for the received message has been completed (see FIG. 6).

Once the MS 26 receives the message processed message, it prepares to send the next message in the queue. If the next time/status message is due, it will be sent. Otherwise, the next message at the queue head is sent.

All messages received from the RCMs 30 will be compared. As soon as two of them match it will be forwarded on to its destination. If a message from one of the RCM 30 does not match the contents of the other three RCMs 30 it will be considered disqualified and marked in the FAILURE state.

If two match but disagree with the next two that also match, then the controllers that had the second match are disqualified. This is a double failure, and an appropriate alarm is generated by the MS 26. Remember that both MSs are sending independent TSE messages to all RPUs. In all failure cases, the RCMs 30 must compare the results returned in the TSE from both MSs prior to deciding which RPU to disqualify. Disqualification always leads to the RPU being transitioned to the FAILURE state. Once in the FAILURE state, the RPU resets itself or is reset. Once the RPU recovers from the reset, it must wait to be replicated by the RPU(s) in the QUALIFIED state.

The RCM 30 sends messages only in response to receiving a message. This can be either a message from an external process or the TSE message. This is a significant ground rule of the RCE 12 as adherence to this rule greatly simplifies the design of the RCE 12. The MR on each RPU does, however, generate messages to the server to determine if the correct version of software is running on the RPU. Multiple messages may be sent in response to receiving a message. The message indicating message completion is always the last message sent as part of the response.

Any actions by the redundancy processes on the RPU that are time-based are triggered by the TSE message. A timeout message is registered with the RCM 30 by a redundancy process. When the RCM 30 receives a TSE, it first sends the TSA message back to the MS 26. Next, it checks to see if any timeouts have expired. A message for each timeout is sent to the process that registered the timeout. The process receiving the timeout message responds by sending one or more other messages. When processing is complete, the process that received the timeout message sends a timeout processing completed message back to the RCM 30.

It is possible for more than one process to register a timeout for the same time. If so, after the RCM 30 receives the timeout processing completed message from the first process, it sends the time to the next registered process. The timeout messages are sent in the same order as the timeouts are registered with the RCM 30. After all of the processes have completed processing the timeout, the RCM 30 sends the message processing completed message back to the MS 26. This allows the MS 26 to send other control messages to the RCMs 30.

Each Message Router (MR) on each Network Processing Unit (NPU), MPU, and RPU must open a session with the RCE 12. The RCM 30 handles the message from the MR for opening a session with the RCE 12. This session alerts the RCM 30 if a message arrives out of sequence with the previous message from the object that initially opened the RCE 12 session. The session is encoded into the sequence number field of the Compunetix Inter-Process Communications (CIPC) header of each message. The sequence number must also be encoded in the CIPC message header.

The RCM 30 rejects any messages that it receives from any MR for which no legitimate RCE 12 session has been established. A generic negative acknowledgement (NAK) message is returned by the RCM 30 in response to such messages.

Each MR on each processor makes a connection to the MS 26 on each MPU. The MR on a MPU connects to its own MS 26 and the MS 26 on the other MPU. That is, the MR on the MPU makes a single connection to the MS 26 on the other MPU and the MS 26 on its local MPU. Messages flow from a MR to the MPU MSs, then from the MS 26 to the RCM 30. If a message originates from a process on the MPU, it flows from the original process to the local MPU MR, then to the local MS 26 and the remote MPU MR, then from the remote MPU MR to the remote MS 26. It is absolutely necessary to ensure that both MSs receive each message addressed to any service resident on the RCE 12 from any MR on any processor.

With reference to FIG. 7, the RCE 12 controls the operations of the MCU 34. The RCE 12 is the primary decision maker for any actions on the system. It is responsible for directing the recovery of other parts of the MCU 34 that may have failures and for allowing and disallowing actions to occur on the MCU 34. For example, if the operator of the MCU 34 wants to make a call from the MCU 34 to a terminal in the network, this action is requested through the RCE 12, which allows or disallows the action based on its knowledge of the state of the MCU 34. The RCE 12 responds appropriately to the user making the request. For requests that originate inside the MCU 34, the component of the MCU 34 that recognizes the need to make the request sends a message to the RCE 12. Again, the RCE 12 uses its knowledge of the state of the MCU 34 to determine whether to grant the request.

The RCE 12 is responsible for all actions on the MCU 34. The RCE 12 has the final say on whether a terminal is allowed to connect to the system 10 or if a terminal is allowed to be in a specific conference. The session controllers routinely interact with the RCE 12 to shuttle terminals (keyset, phone, etc.) into and out of conferences.

In addition to the session controller, the hardware manager (HM) interacts with the RCE 12 to ask it how to configure the hardware that is configured in the system 10. The HM also provides status information to the RCE 12 for it to use in its decision making. For example, the HM might send information such as "phone line Z just went out of service", "one of the non-RCE processors or software on those processors just failed", or "the Ethernet network just collapsed" to the RCE 12.

The interaction of the MCU 34 components really depends on the applications running in the MCU 34. The RCE 12 supports the "brains" of the MCU 34 in that it provides the redundancy necessary to sustain the operations of the target MCU 34 application with respect to reliability and sustainability in the event of at least one hardware or software fault within the processors that comprise the RCE 12 or the software running on those processors.

The RCE 12 is not limited in scope to just the two applications that it currently supports. The RCE 12 can be employed in any system where reliable control is needed to sustain critical applications. C4I (Control, Communications, Computers, and Intelligence) systems, emergency responder communication systems, manned space operations, and safety-critical applications such as nuclear power operations are all applications that could benefit from the RCE 12.

The same processors for the RPUS and MPUs are what run normally inside the MCU 34 outside of the RCE 12. So there is no special hardware to make the RCE 12 work. In fact, the RCE 12 logic itself is flexible enough to run on any six processors on any type of network. The communications path need not be specific to the system 10 in which it is currently deployed at Compunetix, Inc.

Operation of the MCU 34 continues even if only one RPU is viable. This RPU is the dictator and is the sole controlling RPU in the system 10. The RPU continuously makes decisions about the control, management, and monitoring of the MCU 34. It can do this in a solitary or dictator role or with any number of other RPUs that are qualified to perform the same actions. Should the sole remaining viable RPU fail, the MCU 34 would become inoperable as if there never had been a RCE 12 or multiple RPUs in service in the first place.

Definitions

Blade

A blade is an MCU Carrier Card along with any AMC modules in the Carrier Card. It does not include the RTM.

Channel

A channel is a single encoded audio or video signal sent to/from an endpoint. It is unidirectional. A channel possesses one and only one encoded signal, despite the fact that the electronic signal being encoded may represent multiple voices or a composite video image. The terms input audio channel, input video channel, output audio channel, and output video channel further clarify the type of channel. The term channel may also refer to a dedicated data path to/from an endpoint. A data channel may carry either endpoint control information or conferencing data (e.g. data for white boarding).

Check-pointing

Check-pointing is a phrase that means the software or hardware periodically stops and checks the results with the redundant software or hardware. In the case of the RCE, every response from each RPU is check pointed as part of the normal processing of stimulus and response. Other schemes must periodically halt the normal stimulus and response flow to cross-check each other. Stimulus in the sense of the RCE is a message sent to the RCE to ask it a question or inform it of some occurrence in the MCU. A question to the RCE might be along the lines of "can I accept a call from a terminal on network X". Or it might be to inform the RCE of something that changed in the status of a piece of hardware in the MCU, for example "A card was just inserted into slot 2 of shelf 3."

Conference

A conference is a virtual meeting between two or more users. The users communicate using electronic equipment connected together by private or public communication networks. The users may communicate via audio, video, and/or specialized data services such as text chat and virtual whiteboard.

Endpoint

An endpoint is the physical electronic equipment that allows a user to contribute and/or receive multimedia content such as audio and video. For audio, the endpoint contains transducers to convert sound waves to electronic signals and vice versa. For video, the endpoint contains a camera and a display to capture and show video images. Examples of endpoints are keysets, VTC terminals, telephones, and radios.

GCB Slot

A GCB Slot is one of the 2400 16-bit data streams on the Global Conference Bus. GCB slots may be logically grouped to provide higher-quality audio; for example two GCB slots may be dedicated to create a stream for a 32-bit audio channel.

Global Conference Bus

The Global Conference Bus (GCB) carries conference audio data between GCEs. The data in each slot (or set of grouped slots for higher-quality audio) represents a partial summation of the conference audio. The GCB has 2400 GCB slots.

Hardware Manager (HM)

The Hardware Manager is a process in the MVP that configures and manages intelligent components (e.g. Ethernet switch) on the Carrier Card.

Input/Output

Input/Output references normally assume the MVP switch is the reference point. Signals received by the MVP switch are inputs. Signals transmitted from the MVP switch are outputs.

LCB Slot

A LCB Slot is a 16-bit data stream on the LCB. LCB slots may be grouped together to support a higher-quality audio stream; for instance two 16-bit LCB slots may be grouped together to form a 32-bit audio stream.

Line Interface

A Line Interface is a single physical connector on the switch that is dedicated to carrying data to/from endpoints. An example of a line interface is an RJ48C connector supporting a T1 link. Another example is an RJ45 connector supporting an Ethernet connection that carries video data to/from an endpoint.

Local Conference Bus

A Local Conference Bus (LCB) carries partial summations for one or more endpoints between the LCE and GCE. The total number of LCB slots on the LCB varies depending on the total number of endpoints serviced by an LCE. The two directions of the LCB are referred to as the Input LCB (carrying data toward the GCE) and the Output LCB (carrying data from the GCE).

Network Processing Unit (NPU)

The NPU is a microprocessor that primarily processes media data received/transmitted over a network (typically IP).

Platform Manager

The Platform Manager is a component of the MVP switch software that provides a data store for configuration information, download files, and logs and also provides interfaces for external maintenance and operations clients.

Port

A Port is a logical interface that handles one or more channels that support all communications (both control and data) with a single endpoint.

Session

A Session is a managed logical connection between software components. A session has distinct connected versus not connected states, as well as procedures for establishing those states.

Shelf

A Shelf is a single ATCA chassis, including replaceable units such as ATCA blades, RTMs, shelf manager cards, power entry modules, and fan modules. If a chassis requires an external power supply, the term shelf encompasses both the chassis and the power supply.

Single Event Upset

The term Single Event Upset refers to an error condition in a microprocessor, semiconductor, or power transistor that is cause by exposure to free ions or electromagnetic interference.

Slot

The term Slot refers to the space on an ATCA shelf into which a single ATCA blade and companion RTM can be inserted. Slots are identified by logical or physical numbering as defined in the ATCA specification.

Switch

A Switch is a conferencing bridge. The switch consists of one or more shelves.

System

A System is an entire MVP conferencing platform, including switch, platform manager, clients, keysets, and networking components.

User

A User is a person who may participate in a conference or utilize client interfaces. A user has various attributes, such as name and contact information.

User Client

A User Client is a user interface that allows a user to monitor or control various aspects of the switch or their participation in a conference. Typical clients are the maintenance client, operations client, and endpoint user client.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A Reliable Compute Engine (RCE) of a system comprising:
a first, second and at least a third redundant processing unit (RPU); and
an arbitrator in communication with the first, second and third RPUs which sends a message for a corresponding time requiring a decision to the first, second and third RPUs, and receives the decisions made by the first, second and third RPUs, the RPUs only making the decision in response to receiving the message, the arbitrator accepting a first two matching decisions for the corresponding time received from the first, second and third RPUs, and sending the matching decision for the corresponding time to the system, the arbitrator disqualifying a decision received from one of the RPUs that does not match the decision received from the other two RPUs, the arbitrator has a first message processing unit (MPU) and a second MPU, the first MPU sends the message for the corresponding time to and receives the decisions for the corresponding time from the first, second and third RPUs, the second MPU sends subsequent messages for subsequent corresponding times to and receives decisions for the subsequent corresponding times from the first, second and third RPUs when the first MPU fails, each MPU is a communication interface which communicates with the system, the first RPU determines that the first MPU fails.

2. The RCE of claim 1 wherein the first MPU synchronizes execution of the message for the corresponding time by the first, second and third RPUs.

3. The RCE of claim 2 wherein the each MPU includes an MPU processor and a message sequencer (MS) that is a communication interface, the MS of the first MPU is an active MS and the MS of the second MPU the standby MS, unless the active MS fails and then the standby MS becomes the active MS.

4. The RCE of claim 3 wherein each RPU includes an RPU processor and a redundant controller manager (RCM) that coordinates applications to run simultaneously on all RPU processors.

5. The RCE of claim 4 wherein the MPUs and the RPUs are disposed in a cabinet.

6. The RCE of claim 5 wherein each RPU receives each message that is received by the RCE.

7. The RCE of claim 6 wherein both the active MS and the standby MS receive each message received by the RCE.

8. The RCE of claim 7 wherein each RCM sends a response to the active MS to each message the RCM receives.

9. The RCE of claim 8 wherein the active MS saves responses it receives from the RCMs, and the MS sends a time save event (TSE) message having information about the responses.

10. The RCE of claim 9 wherein each RCM forms a vote about itself, the other RCMs and the active MS and the standby MS when the RCM receives the TSE message.

11. A method for processing data from a system comprising the steps of:
sending a message from a first message processing unit (MPU) of a redundant controller engine (RCE) to a first, second and third RPU of the RCE for a corresponding time requiring a decision by the first, second and third RPUs;
receiving by the first MPU decisions made by the first, second and third RPUs, the RPUs only making the decision in response to receiving the message;
comparing by the first MPU the decisions until two of the decisions match;
accepting by the first MPU the decision that matches for the corresponding time received from the first, second and third RPUs;
the arbitrator disqualifying a decision received from one of the RPUs that does not match the decision received from the other two RPUs;

sending the matching decision for the corresponding time to the system;
the first MPU failing;
the first RPU determining that the first MPU fails; and
sending subsequent messages by a second MPU of the RCE for subsequent corresponding times to and receiving decisions for the subsequent corresponding times from the first, second and third RPUs after the first MPU fails, each MPU is a communication interface which communicates with the system.

12. The method of claim 11 including the step of the first MPU synchronizing execution of the message for the corresponding time by the first, second and third RPUs.

13. The method of claim 12 wherein the step of sending the message from the first MPU to the first, second and third RPUs of the RCE for a corresponding time requiring a decision by the first, second and third RPUs includes the step of sending the message from a message sequencer (MS) of the first MPU to the first, second and third RPUs of the RCE for a corresponding time requiring a decision by the first, second and third RPUs, and the step of receiving by the first MPU decisions made by the first, second and third RPUs includes the step of receiving by the MS of the first MPU decisions made by the first, second and third RPUs.

14. The method of claim 13 wherein each RPU includes an RPU processor and an redundant controller manager (RCM) and including the step of coordinating with a redundant controller manager (RCM) of each RPU applications to run simultaneously on all RPU processors.

15. The method of claim 14 wherein the MPUs and the RPUs are disposed in a cabinet.

16. The method of claim 15 including the step of each RPU receives each message that is received by the RCE.

17. The method of claim 16 wherein each MPU includes an MPU processor and a message sequencer (MS) that is a communication interface, the MS of the first MPU is an active MS and the MS of the second MPU is a standby MS, unless the active MS fails and then the standby MS becomes the active MS, and including the step of both the active MS and the standby MS receiving each message received by the RCE.

18. The method of claim 17 including the step of each RCM sending a response to the active MS to each message the RCM receives.

19. The method of claim 18 including the step of the active MS saving responses it receives from the RCMs, and the MS sends a time save event (TSE) message having information about the responses.

20. The method of claim 19 including the step of each RCM forming a vote about itself, the other RCMs and the active MS and the standby MS when the RCM receives the TSE message.

21. A Reliable Compute Engine (RCE) of a system comprising:
a first, second, third and at least a fourth redundant processing unit (RPU); and
an arbitrator in communication with the first, second, third and fourth RPUs which sends a message for a corresponding time requiring a decision to the first, second, third and fourth RPUs, and receives the decisions made by the first, second, third and fourth RPUs, the RPUs only making the decision in response to receiving the message, the arbitrator accepting a first two matching decisions for the corresponding time received from the first, second, third and fourth RPUs, and sending the matching decision for the corresponding time to the system, the arbitrator disqualifying a decision received from one of the RPUs that does not match the decision received from the other three RPUs, the arbitrator has a first message processing unit (MPU) and a second MPU, the first MPU sends the message for the corresponding time to and receives the decisions for the corresponding time from the first, second, third and fourth RPUs, the second MPU sends subsequent messages for subsequent corresponding times to and receives decisions for the subsequent corresponding times from the first, second, third and fourth RPUs when the first MPU fails, each MPU is a communication interface which communicates with the system, the first RPU determines that the first MPU fails, when both MPUs determine that one of the first, second, third or fourth RPUs has failed, then the other RPUs vote the RPU to a failure state, when a next two decisions match after the first two matching decisions but do not match the first two matching decisions, then the RPUs that provided the next two matching decisions are determined to have failed and an alarm is generated by the first MPU.

22. A method for processing data from a system comprising the steps of:
sending a message from a first message processing unit (MPU) of a redundant controller engine (RCE) to a first, second, third and fourth RPU of the RCE for a corresponding time requiring a decision by the first, second and third RPUs;
receiving by the first MPU decisions made by the first, second, third and fourth RPUs, the RPUs only making the decision in response to receiving the message;
comparing by the first MPU the decisions until two of the decisions match;
accepting by the first MPU the decision that matches for the corresponding time received from the first, second, third and fourth RPUs;
the arbitrator disqualifying a decision received from one of the RPUs that does not match the decision received from the other three RPUs;
sending the matching decision for the corresponding time to the system;
when both MPUs determining that one of the first, second, third or fourth RPUs has failed, then the other RPUs vote the RPU to a failure state;
when a next two decisions matching after the first two matching decisions but not matching the first two matching decisions, then the RPUs that provided the next two matching decisions are determined to have failed and an alarm is generated by the first MPU
the first MPU failing;
the first RPU determining that the first MPU fails; and
sending subsequent messages by a second MPU of the RCE for subsequent corresponding times to and receiving decisions for the subsequent corresponding times from the first, second and third RPUs after the first MPU fails, each MPU is a communication interface which communicates with the system.

* * * * *